Figure 1:
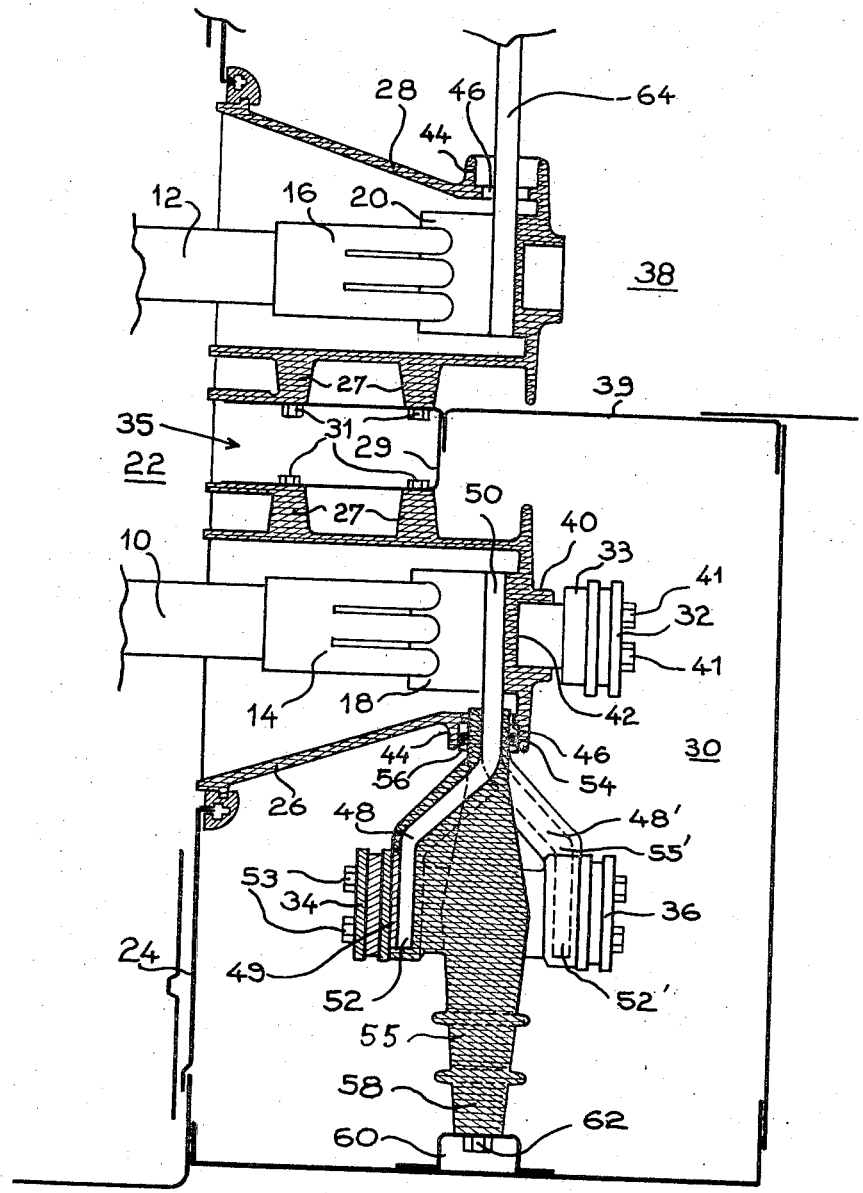

United States Patent [19]
Ferton et al.

[11] 3,818,281
[45] June 18, 1974

[54] BUS BAR AND STATIONARY DISCONNECT CONTACT ASSEMBLY FOR DRAW-OUT SWITCHGEAR

[75] Inventors: Jean-Yves Ferton; Georges Vento, both of Grenoble, France

[73] Assignee: Merlin Gerin Societe Anonyme, Grenoble, France

[22] Filed: Nov. 30, 1972

[21] Appl. No.: 310,854

[30] Foreign Application Priority Data
Dec. 9, 1971   France .......................... 71.44332

[52] U.S. Cl. .......................... 317/103, 200/50 AA
[51] Int. Cl. .......................... H02b 11/04
[58] Field of Search .................. 317/103; 20/50 AA

[56] References Cited
UNITED STATES PATENTS
3,015,756  1/1962  Kreekon .......................... 317/103
3,562,593  2/1971  Bould .......................... 317/103

FOREIGN PATENTS OR APPLICATIONS
1,934,804  8/1970  Germany .......................... 100/50 AA Primary Examiner—Robert K. Schaefer
Assistant Examiner—Gerald P. Tolin
Attorney, Agent, or Firm—Stevens, Davis, Miller & Mosher

[57] ABSTRACT

A bus bar and stationary disconnect contact assembly for three-phase draw-out switchgear having standardized insulating shells housing the stationary disconnect contacts and standardized moulded insulating parts to support hte triangularly disposed bus bars and the connecting conductors thereof in a manner ensuring high compactness and excellent mechanical resistance to electrodynamical forces. The shells and the other parts are readily accessible and can easily be mounted and disassembled.

3 Claims, 2 Drawing Figures

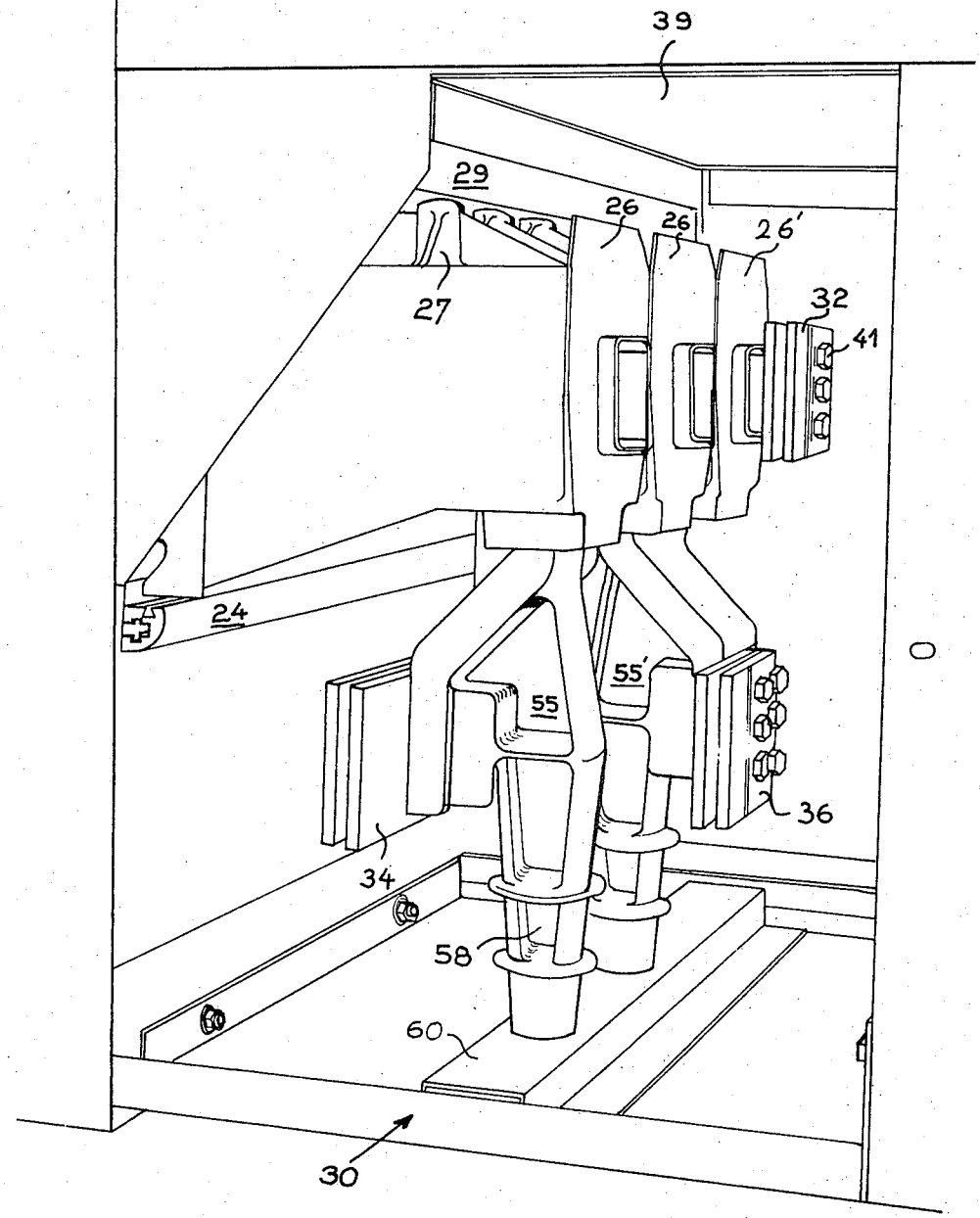

BUS BAR AND STATIONARY DISCONNECT CONTACT ASSEMBLY FOR DRAW-OUT SWITCHGEAR

This invention relates to bus bar and stationary disconnect contact assemblies for three-phase draw-out circuit interrupters having two vertically superposed sets of three movable disconnect contacts each, an input set and an output set, and the invention relates more particularly to metal-enclosed apparatus arranged in cubicles.

It is an object of the invention to provide an arrangement having a highly standardized structure capable of withstanding high electrodynamical forces due to short-circuit currents flowing through the disconnection (or isolating) contacts in the engaged closed-circuit position thereof without causing excessive strain of the mechanical parts or undue disengaging movements of the movable disconnect contacts.

It is another object of the invention to provide an arrangement of the kind mentioned in which the stationary live parts are positioned and insulated in order to obtain an extremely compact structure of high mechanical strength which has smaller dimensions than known switchboards of the same rating and in which the major elements are more readily accessible and exchangeable.

These and other objects and advantages will become apparent from the following description of an embodiment of the invention depicted diagrammatically in the annexed drawings in which:

FIG. 1 is an elevational cross section through a pole of an assembly according to the invention; and FIG. 2 is a perspective view of the backside of the lower part of the assembly, the bus bars being broken away for a better understanding of the drawing.

Referring now to the drawings, there is shown one conductor 10 of a lower set of three horizontally spaced apart parallel conductors (the other conductors being masked by conductor 10), which are carried by an electrical draw-out apparatus such as a circuit interrupter (not shown) and one conductor 12 of an upper set of three conductors, the conductor 10 being for instance one of the input conductors and the conductor 12 one of the output conductors. Each input conductor bears at its free end a disconnect or isolating contact 14 and each output conductor carries a disconnect contact 16 and all the six contacts are movable with the draw-out appratus in a well-known manner, whereby the two sets of movable disconnect contacts 14 and 16 are adapted to engage two sets of stationary disconnect contacts 18 and 20, respectively. The movable draw-out apparatus and the stationary parts may be housed in a well-known manner in a metal-clad cubicle, several of which being generally arranged side-by-side to constitute a switchboard fed by a set of three-phase bus bars. The draw-out circuit interrupter is housed in a compartment 22 only the back wall 24 of which being shown in the figures. Each stationary disconnect contact such as 14, 16 is individually housed in a bell-shaped shell 26, 28, respectively, of insulating moulded material and all the shells are identically shaped, the three upper shells 28 and the three lower shells 26 being symmetrically disposed with respect to a horizontal symmetry plane (not shown). The enlarged end portion of each flaring out shell defines a mouth, flush with the back wall 24, which is connected to the latter in a tight manner. The stationary disconnect contacts 18, 20 are secured in a suitable manner, for instance by bolts to the inmost or bottom wall portion of the shells and the conductors 10, 12 of the circuit breaker can engage the stationary contacts through the mouths of the shells. A stationary support structure formed by a horizontal U-shaped beam 29 extends between the two sets of shells 26, 28 which carry studs 27 bearing on the beam 29 and secured thereto by means of bolts 31. Some of the studs 27 are vertically aligned with the engagement zone of the disconnect contacts 14, 18 and 16, 20 to withstand the high electrodynamical forces which develop when short-circuit fault currents flow through the contacts. The mouth 35 of the beam 29 is flush with the back wall 24 so that the bolts 31 are readily accessible from the front side of the cubicle to permit disassembling and withdrawal of the shells from the front side of the installation. The shells 26 of the lower set project into a metal-clad bus bar compartment 30 containing the three phase bus bars 32, 34, 36 which extend horizontally perpendicularly to the longitudinal direction of the conductors 10, 12, through the different cubicles of the switchboard. The compartment 30 is separated from the compartment 22 of the circuit interrupter by the partition wall 24 and the shells 26 of insulating material in a more or less gas-tight manner to avoid the penetration of ionized gas from one compartment into the other in case of occurrence of fault arcs. The shells 28 of the upper set project into a compartment 38 only the bottom partition wall 39, separating the compartment 38 from the bus bar compartment 30, being shown on the figures. The upper contacts 20 are connected by means of conductors 64 passing through a lateral aperture 46 in the end wall portion of shells 28 to branch circuits (not shown).

The shells 26, 28 are preferably molded from a thermosetting material such as reinforced polyester or epoxy resin in a combination mold permitting the obtaining of either: a shell as shown at 26 having an end collar 40 bounding an operculum closing the bottom wall portion 42 and an upper lateral collar 44 bounding an aperture 46; or a like shell as shown at 26' of FIG. 2, having however a backside collar 40 bounding a perforated bottom and a lateral collar 44 bounding a non perforated operculum. The phase bus bars 32, 34 and 36 comprise each in the embodiment shown a pair of spaced apart elementary bars bolted together and the upper bus bar 32 extends adjacent the outer side of the bottom 42 of the shells 26 of the lower set whereby only one of the shells, i.e. shell 26', has a perforated bottom 42 permitting connection of the corresponding stationary disconnect contact 18 to the phase bus bar 32 through a plot 33 of conducting material and suitable bolts 41. The bottom wall portions 42 of the remaining pair of shells 26 being closed, the phase bus bar 32 can extend closely thereto without diminishing the dielectric strength of the installation, thereby ensuring a high compactness of the cubicle. The second and third phase bus bars 34 and 36 extend on the same horizontal level between the phase bus bar 32 and the floor of the compartment 30 whereby the phase bus bar 36 is vertically aligned with the bus bar 32, the bus bar 34 being located substantially midway under the shells 26. The phase bus bars 34 and 36 are electrically connected to the respective stationary contacts 18 by conductors 48 and 48', respectively, and each of the latter is individually insulated and supported by molded insulating bushings 55 and 55', respectively. Each bushing 55 and 55' embedding conductors 48 and 48' comprises: an upper end portion fitting into the downwardly directed lateral aperture 46 of the corresponding shell 26; a lateral aperture adapted to accomodate connection means, such as a disc 49 of conducting material and bolts 53, connecting the bus bars 34, 36 to the uncovered lower ends 52, 52' of the respective conductors 48, 48'; and a downwards projecting leg or stud 58 the lower end of which is attached through a bolt 62 to a horizontal beam 60 extending in parallel to the phase bus bars and resting on the floor of the compartment 30. The upper end 50 of conductor 48, 48' is not embedded in the insulating mass of bushings 55, 55' to permit the connection thereof by any suitable means to the contacts 18. An O-ring 56 resting on a peripheral collar 54 of the upper end portion of bushings 55, 55' provides a gas-tight connection between the bushings and the corresponding shells. It is to be noted that the support bushings 55, 55' are of identical shape but rotated through 180° to support the bus bars 34 and 36 and the conductors 48, 48', respectively, from the bottom of the cubicle. The triangular disposition of the bus bars one of which extends under the shells 26 and the specific connection of the bus bars to the stationary disconnect contacts 18 by means of conductors passing through the back wall 42 of one shell and of insulated conductors passing through the apertures 46 in the near lateral wall of the two other shells permits the saving of space without decreasing the dielectric strength of the installation. On the other hand, the use of like shaped bushings 55, 55' and shells 26, 28 (apart from the perforation of the opercula 42, 46) allows a lowering of the cost of the switchboards.

It should be understood that the invention is not limited to the specific details disclosed and illustrated hereinbefore and that modifications may be provided without departing from the spirit of the invention. For instance, the bus bars may be located in the upper compartment and the connections to the branch circuits in the lower compartment. Also, the studs 58 may be secured not to the bottom wall of compartment 30 but to another wall such as the front or rear wall.

What is claimed is:

1. A bus bar and stationary disconnect assembly for use with a three-phase, draw-out, circuit interrupter having two vertically spaced sets of each of three, horizontally aligned, movable, disconnect contacts, said assembly comprising:
   a. a first and a second set of three, molded bell-shaped shells of insulating material registering with said movable disconnect contacts and having each an inner rear wall portion supporting a stationary disconnect contact adapted for engagement with a corresponding one of said movable disconnect contacts, each of said stationary and movable contacts mating to provide an engagement zone;
   b. a pair of generally horizontally extending support structures, one of which extends between said sets of shells and the other of which extends on the opposite side of said first set of shells;
   c. means supporting said sets of shells from said one support structure between said first and second sets of shells, said supporting means aligned with said engagement zones;
   d. three generally horizontally extending phase bus bars, a first one of which extends along an outer rear wall portion of a shell of said first set of shells, the second and third phase bus bars extending on a common horizontal level between said first set of shells and said other support structure;
   e. first, second and third comductor means connecting said first, second and third phase bus bars to said stationary disconnect contacts, respectively, through the shells of said first set of shells; and
   f. molded insulating means to insulate said second and third conductor means and to support said second and third phase bus bars on said other support structure.

2. An assembly according to claim 1, said molded insulating means comprising an upper bushing insulating said second and third conductor means, respectively, and extending into an aperture defined by the corresponding shells of said first set of shells.

3. A bus bar and stationary disconnect assembly for use with a three-phase, draw-out circuit interrupter having two vertically spaced groups of each of three, horizontally aligned, movable, disconnect contacts, said assembly comprising:
   a. first and second sets, each including three, molded, bell-shaped shells of insulating material registering with said movable disconnect contacts, each said shell having an inner rear wall portion supporting a stationary disconnect contact adapted for engagement with a corresponding one of said movable disconnect contacts, each of said stationary and movable contacts mating to provide an engagement zone, each said shell including an end collar and a lateral collar, two of said shells including lateral collars having an aperture through a lateral collar wall, the walls of the end collar of the two shells being closed, the third shell including an end collar having a perforated wall, the walls of the lateral collar of the third shell being closed, said three shells being identically shaped;
   b. a pair of generally horizontally extending support structures, one of which extends between said sets of shells and the other of which extends on the opposite side of said first set of shells;
   c. means supporting said sets of shells from said one support structure between said first and second sets of shells, said supporting means including connector elements vertically aligned with the engagement zones;
   d. three generally horizontally extending phase bus bars, a first one of which extends along the outer rear wall of a shell of said first set of shells, the second and third phase bus bars extending on a common horizontal level between said first set of shells and said other support structure, said first and second phase bus bars being vertically aligned, said third phase bus bar being located substantially midway between said first set of shells and said other support structure;
   e. first, second and third conductor means connecting said first, second and third phase bus bars to said stationary disconnect contacts, respectively, through the shells of said first set of shells, said first conductor means extending through said perforated wall of the end collar of the third shell to a corresponding stationary disconnect, said second and third conductors extending through said apertures of the lateral collars of the other two shells; and f. molded insulating means for insulating said second and third conductor means and for supporting said second and third phase bus bars on said other support structure, said molded insulating means including first and second support bushings for said second and third conductor means, respectively, said first and second support bushings being of identical shape and being rotated 180° with respect to each other to support said second and third phase bus bars.

* * * * *